April 2, 1963  T. J. SCARNATO  3,083,519
MOWER GUARD STRUCTURE
Filed Oct. 11, 1960

Inventor:
Thomas J. Scarnato
Paul O. Pippes
Atty.

United States Patent Office 3,083,519
Patented Apr. 2, 1963

3,083,519
MOWER GUARD STRUCTURE
Thomas J. Scarnato, Park Ridge, Ill., assignor to International Harvester Company, Chicago, Ill., a corporation of New Jersey
Filed Oct. 11, 1960, Ser. No. 61,869
4 Claims. (Cl. 56—309)

This invention relates to mower guards for reciprocating type mowers and more specifically to an novel means of fastening and maintaining the ledger plate in secured relation to the guard.

In mower guard constructions of previous designs various arrangements for fastening and maintaining the ledger plate on the mower guard have been suggested, however, these in general are either extremely expensive or require very accurate control of machining, etc. or are extremely difficult to apply and remove.

A general object of the invention is to provide a novel mower guard and ledger plate therefor and a rivet securement between the ledger plate and the mower guard wherein a portion of the rivet is of flexible, easily deformable construction which facilitates application and removal of the ledger plate if damaged and which maintains the ledger plate adequately secured throughout its service life and even after extensive wear occurs on the mower guard.

A further object of the invention is to provide a novel mower guard wherein a novel guard and protection is afforded for the sickle sections cooperating with the mower guard in the provision of novel guard edges at the laterally opposite sides of the mower guard finger which overlays and which guards the sickle in cooperative relation with the ledger plate.

A still further object is to provide a novel quick fastening for a ledger plate to a mower guard such as may be readily applied and removed by the farmer in the field, the construction comprising a novel rivet assembly which includes a solid section upper portion which anchors the ledger plate against planar movement and a flexible lower section which is comprised of a hollow portion which is relatively readily deformable so as to provide a novel rivet head against a countersunk bore surface which attains a tensile load upon the rivet so as to tightly draw the ledger plate against the ledger plate seat on the mower guard.

These and other objects and advantages inherent in and encompassed in the invention will become more readily apparent from the specification and the drawings wherein.

Description of the Invention

Figure 1:
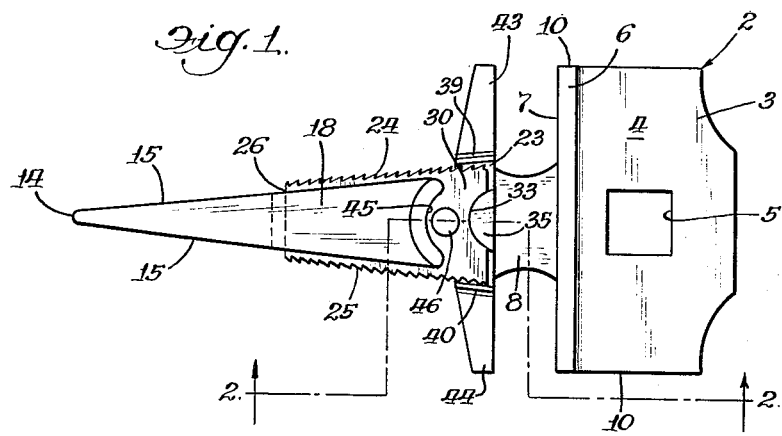
FIG. 1 is a plan view of the novel mower guard assembly.

Describing the invention in detail, the novel mower guard assembly generally designated 2 comprises a rear fastening bracket on base portion 3 which is a substantially flat piece providing an upper seat 4 for an associated mower bar, as well understood by those in the art, the portion 3 being secured to the mower bar by a bolt (not shown) which is passed through the central opening 5 in the securing bracket portion 3. The forward edge of the bracket portion 3 is provided with an upstanding frontal flange or shoulder 6 which provides a seat against the forward edge of the associated mower bar as well known to those skilled. The forward side 7 of the base portion 3 of the mower guard is integrally united to a relatively narrow body portion 8 of the guard finger generally designated 9, the body portion 8 being disposed medially between the lateral edges 10 of the base portion 3 and being recessed on its upper side to provide a knife or sickle-back guideway 12.

According to the present construction, the body portion 8 forwardly of the guideway 12 is a relatively thick solid section and has a forwardly and upwardly curved bottom edge 13 which terminates in a point or nose 14. The lateral sides 15, 15 of the forward portion 16 of the body converge toward the point 14 and the top side 17 of the body portion slopes upwardly and rearwardly and with the upper portion merges into a rearwardly extending lip 18.

The lip 18 is provided with a substantially flat bottom side 19 which slopes upwardly and rearwardly and which is spaced from a ledger seat 20 which is formed on the top side of the intermediate portion 21 of the body 8 which at its lateral sides continues with the same flare as the side portions 15, 15 and in effect is a continuation of these side surfaces. The lip 18 and the seat 20 accommodate a ledger plate 23 therebetween, the plate 23 being a substantially flat member with laterally sharpened edges 24 and 25 which project slightly beyond the lateral extremes of the body portion of the guard, that is, they project beyond the sides 15, 15, the said ledger plate 23 being somewhat trapezoidal in shape and having a forward substantially flat end 26 which fits the notch 27 between the forward end portion 28 of the lip 18 and the forward marginal edge of the seat 20 and is snugly received therein. The top side 30 of the ledger plate 23 is substantially flat and between it and the surface 15 which diverges upwardly and rearwardly with respect to the surface 30 there is formed a knife or sickle section slot 31 through which the sickle section operates in cooperation with the ledger plate 23 as the conventional sickle (not shown) is reciprocated with respect to the mower guard, as is well understood by those skilled in the art. The rear margin or edge of the ledger plate 23 is provided with a substantially semi-circular notch 33 disposed substantially medially between the lateral edges 24 and 25 of the ledger plate 23 and admits a complementary boss 35 therein, said boss projecting upwardly from the rear portion 37 of the body 8 of the mower guard finger. The lateral sides 24 and 25 of the ledger plates 23 are chamfered upwardly and fit complementally against the laterally spaced shoulders or lugs 39 and 40 which are formed integral and extend upwardly from the rear portion 37 of the body 8 of the finger 9, the said lugs 39 and 40 holding the rear extremity of the ledger plates 23 against lateral displacement. As best seen in FIG. 1, the body portion 3 is provided with laterally extending wing portions 43 and 44 which form the front guide portion of the knife backing slot 12.

Figure 2:
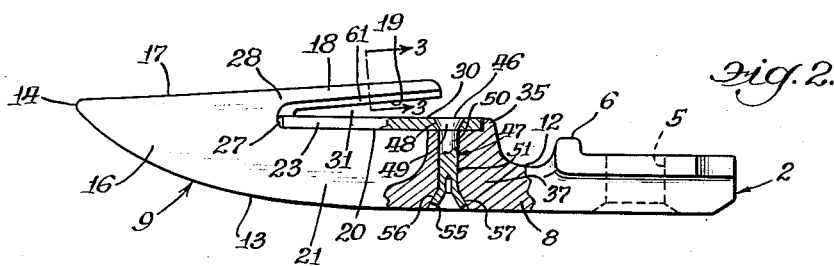
FIG. 2 is a side elevational view, partially in section, taken substantially on the line 2—2 of FIG. 1.
Figure 5:
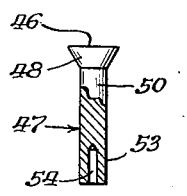
FIG. 5 is an enlarged elevational view partly in section of the novel rivet shown in its pre-assembly form.
Figure 3:
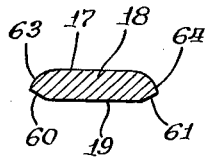
FIG. 3 is an enlarged sectional view taken substantially on the line 3—3 of FIG. 2.
Figure 4:
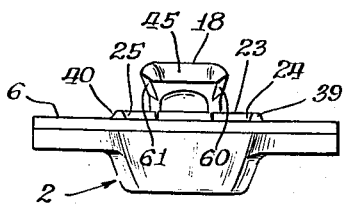
FIG. 4 is a rear view of the mower guard assembly.

It will be noted that the upper rear edge of the guard lip 18 is recessed as at 45 to admit the head 46 of the rivet generally designated 47 so that the head 46 is received within the countersunk bore 48 in the ledger plate 23, the countersunk bore 48 providing an upwardly tapering wedge face complementally engaging the underside 49 of the rivet head 46. The head 46 is integrated with an upper shank portion 50 which is of solid section and which passes through a complementary vertical cast or irregularly surfaced aperature 51 which is located in the rear portion 37 of the body 8 of the finger 9, the rivet or securing member 47 having a relatively flexible lower end portion 53 which is provided with a central bore 54, the said lower end portion 53 being deformed from that shown in FIG. 5 to that shown in FIG. 2 to provide a flared head portion 55 which has an upper substantially conical wedge face 56 engaging a complementary countersunk surface 57 at the lower end of the bore 51. It will be seen that the head portion 55 is countersunk with respect to the bottom edge 13 of the finger and has substantial depth, and it has been found through actual use that this fact contributes to retainment of the pin because the head portion 55 is not worn off very quickly as has been occurring in previous constructions wherein the head projects below the lower edge 13 of the finger. In addition, the resilient or yieldable nature of the lower portion 53 of the pin has contributed to its fast removal in the field when the ledger plate need be changed. This is accomplished merely by the use of a punch and the mere application of a new rivet with tight securement of the ledger plate to the finger.

Another feature of this construction resides in affording a yield to shocks which may be developed on the ledger plate particularly if in the manufacture the seating of the plates is not exact with respect to the seat 20 or its relation with respect to the shoulders 39 and 40 or with respect to its snugness into the slot 27 at the forward end of the seat. Relief is attained from side impacts against the ledger plate by the provision of the novel guide surfaces 60 and 61 at the lateral edges 63 and 64 of the lip portion 18, these surfaces being sloped downwardly and inwardly and providing novel guides for the knife sections in the event that material wedges in between the ledger plates and the knife sections, thus not only preventing the knife sections from bluntly striking the edges 63 and 64 of the finger as they do at the present time whereby the full impact of the knife section is imparted to the guard with consequent frequent breaking of the knife sections and guards. At the same time the guard construction in effect promotes a shearing action between the ledger plate and the knife section and eliminates forces which tend to can the ledger plate.

Thus it will be noted that a novel and efficient mower guard assembly and ledger mounting structure has been disclosed, but it will be understood that other forms of the invention will become readily available to those skilled in the art within the scope of the appended claims.

What is claimed is:

1. A mower guard comprising a rear mounting portion, a finger portion projecting forwardly therefrom and providing an upper ledger plate seat, a lip portion projecting rearwardly from the finger portion in overlapping overlying relation to the seat and defining a sickle-receiving slot therewith and said lip portion having a lower face sloped upwardly and outwardly along its lateral edge portions.

2. The invention according to claim 1 and a ledger plate on the seat, and securing means having portions of different yield characteristics securing said ledger plate against said seat.

3. The invention according to claim 1 and a ledger plate on the seat, and securing means comprising a rivet extending through openings in said ledger plate and finger portion and said rivet having a solid upper portion and a hollow lower portion.

4. The invention according to claim 1 and a ledger plate on the seat, and a rivet securing the ledger plate to the guard, said rivet having different sections along its length.

References Cited in the file of this patent
UNITED STATES PATENTS

| | | |
|---|---|---|
| 2,017,466 | Liebetrau | Oct. 15, 1935 |
| 2,046,590 | Swanson | July 7, 1936 |
| 2,543,063 | Rodgers | Feb. 27, 1951 |
| 2,716,325 | McNamara | Aug. 30, 1955 |
| 2,747,358 | Frazee | May 29, 1956 |